(12) United States Patent
Xia et al.

(10) Patent No.: US 12,422,801 B2
(45) Date of Patent: Sep. 23, 2025

(54) DATA ACQUISITION METHOD AND INDUSTRIAL DEVICE

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Zi-Qing Xia, Chengdu (CN); Lin-Kuan Lu, Chengdu (CN); Ting-Rui Wang, Chengdu (CN); Qiang Fu, Chengdu (CN); Yi Pu, Chengdu (CN); Rui-Lian Jiang, Chengdu (CN); Jin-Feng Bian, Chengdu (CN)

(73) Assignees: HONGFUJIN PRECISION ELECTRONICS (CHENGDU) Co., Ltd., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 645 days.

(21) Appl. No.: 17/714,437

(22) Filed: Apr. 6, 2022

(65) Prior Publication Data

US 2023/0161303 A1     May 25, 2023

(30) Foreign Application Priority Data

Nov. 25, 2021   (CN) .......................... 202111413958.X (51) Int. Cl.
```
H04L 69/18      (2022.01)
G05B 15/02      (2006.01)
H04L 67/02      (2022.01)
H04L 67/025     (2022.01)
H04L 67/06      (2022.01)
```

(52) U.S. Cl.
CPC .............. *G05B 15/02* (2013.01); *H04L 69/18* (2013.01); *H04L 67/02* (2013.01); *H04L 67/025* (2013.01); *H04L 67/06* (2013.01)

(58) Field of Classification Search
CPC .......................................... G05B 2219/31369
USPC ........................................................... 700/29
See application file for complete search history.

(56) References Cited

U.S. PATENT DOCUMENTS

| | | | | |
|---|---|---|---|---|
| 7,467,018 B1* | 12/2008 | Callaghan | .......... | G05B 19/4186 700/1 |
| 2006/0064188 A1* | 3/2006 | Ushiku | ............ | G05B 19/41865 700/96 |
| 2014/0163749 A1* | 6/2014 | Phillips | ................ | G06F 3/0484 700/283 |
| 2016/0323392 A1* | 11/2016 | Lawson | .............. | G06F 16/2471 |
| 2022/0197748 A1* | 6/2022 | Behera | ................ | G06F 11/1443 |

(Continued)

*Primary Examiner* — Emilio J Saavedra
(74) *Attorney, Agent, or Firm* — ScienBiziP, P.C.

(57) ABSTRACT

A method of acquiring data for industrial and production devices and equipment includes generating a first operation parameter according to a data acquisition protocol; performing data processing on the first operating parameter to obtain a second operating parameter; uploading the second operation parameter to a server system and receiving a control instruction from the server system. The control instruction is generated by the server system according to the second operation parameter, the control instruction is configured to control operations of the industrial equipment. A device and a non-volatile storage medium therein, for performing the above-described method, are also disclosed.

3 Claims, 4 Drawing Sheets

(56) References Cited

U.S. PATENT DOCUMENTS

2022/0206473 A1* 6/2022 Qiu .................... H04L 43/18
2022/0417051 A1* 12/2022 Reul ................... H04L 12/282

* cited by examiner

DATA ACQUISITION METHOD AND INDUSTRIAL DEVICE

FIELD

The subject matter herein generally relates to field of data acquisition, more specifically to a data acquisition method and an industrial device.

BACKGROUND

With the development of big data technology, many decisions in industrial manufacturing are based on big data analysis and intelligent control of equipment thereby. The existing data acquisition methods require the enterprise system to connect with the equipment of different manufacturers. Problems such as long docking time, high-level coupling, repeated development, long development cycle, and low efficiency. The format of equipment and the operation of them is diverse, and the amount of data is large and scattered. When the equipment transmits operation parameters to the enterprise server system, packet loss can easily occur.

Therefore, there is a room for improvement in such testing.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
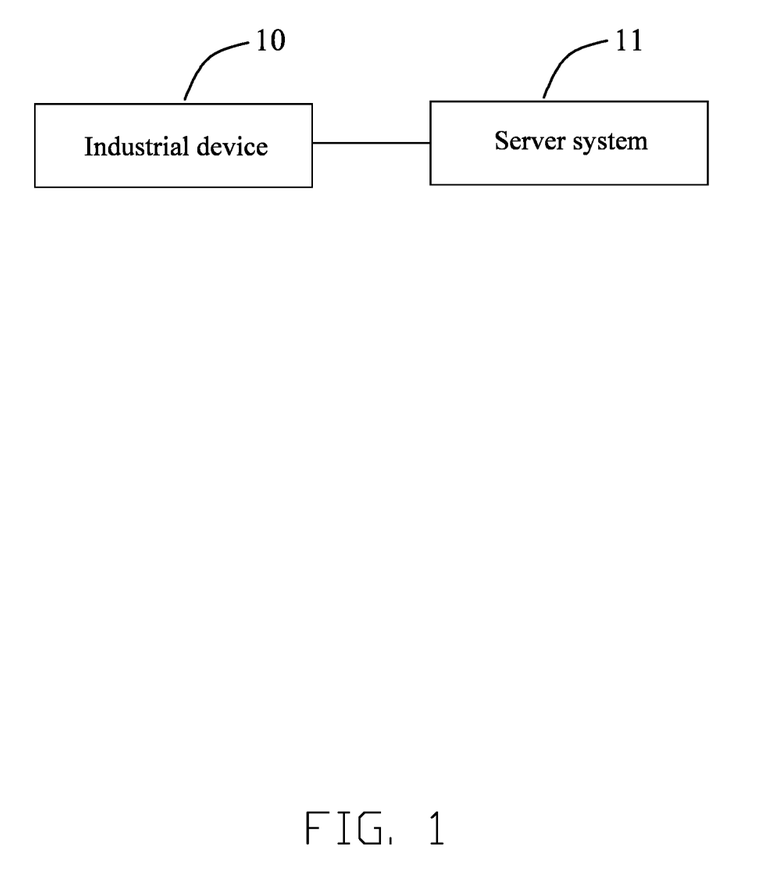
FIG. 1 is block diagram of an embodiment of an industrial device according to the present disclosure.

FIG. 1 illustrates an industrial device 10 in accordance with an embodiment of the present disclosure.

As shown in FIG. 1, the industrial device 10 may be a device or item of equipment that performs tasks on products being made in the factory. For example, the industrial device 10 may be a chip mounter, a reflow furnace. The industrial device 10 can be connected to a server system 11 through a network. For example, the industrial device 10 can be connected to the server system 11 through a wired connection (such as Ethernet, RS-232, RS-485, etc.) or a wireless connection (WI-FI, BLUETOOTH, ZIGBEE, etc.). The server system 11 may be a computer or system for managing the industrial device 10. For example, the server system 11 may be a Manufacturing Execution System (MES).

In some embodiments, during its production process, the industrial device 10 will generate the first operation parameter associated with its operation state. For example, the industrial device 10 can generate the first operation parameter including multiple dimensions such as data concerning device state, data as to device settings and configuration, data as to real-time operations, and data as to device production process. The second operation parameter is obtained by processing the first operation parameter. The industrial device 10 can transmit the second operation parameter to the server system 11 through the network. The data as to device state indicates the states of the device during operation. The device setting data indicates the working parameters of the device during operations. The real-time data indicates the real-time operations of the device, for example, its temperature, and its running speed. The production process data indicates production output, production category, and other information of the device.

When the server system 11 receives the second operation parameter transmitted by the industrial device 10, the server system 11 analyzes the data of the second operation parameter and generates a control instruction accordingly. The control instruction controls the operation state of the industrial device 10, for example, the control instruction may pause or issue alarm in respect of the industrial device 10, and optimizes data for the device settings of the industrial device 10.

In some embodiments, the server system 11 can use the big data algorithm model to model and analyze the second operation parameter, and thereby determine whether there are health and safety problems in the industrial device 10. If the industrial device 10 does have health and safety problems, the server system 11 will issue a control command to the industrial device 10 to control the industrial device 10 to adjust and optimize the first operation parameter or issue alarm and control the industrial device 10 to stop operation.

It should be noted that different industrial devices 10 can generate first operation parameter with the same format according to a specific data acquisition protocol, and communicate with the server system 11 according to the protocol.

In some embodiments, the industrial device 10 can perform data processing on the first operation parameter before transmitting the first operation parameter to the server system 11. For example, the industrial device 10 can check whether the first operation parameter meets the format standard of the data acquisition protocol, extract the data element in the first operation parameter, and then upload the data element to the server system 11 as the second operation parameter.

In some embodiments, the industrial device 10 can detect its own operating state during operations. When the operation state is abnormal, the industrial device 10 can be restarted and reset to return to the normal operating state.

Figure 2:
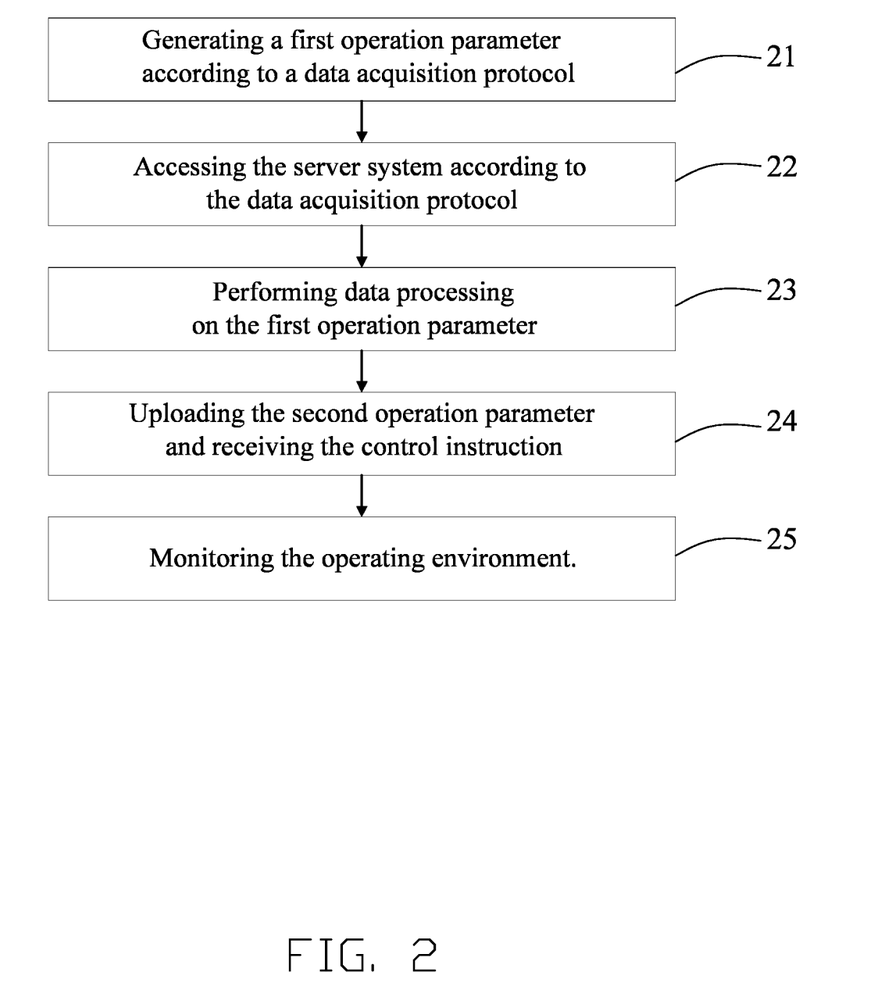
FIG. 2 is flowchart of an embodiment of a data acquisition method according to the present disclosure.

FIG. 2 shows a flow chart of one embodiment of a data acquisition method in accordance with an embodiment of the present disclosure. The data acquisition method can be applied to industrial device 10.

Each block shown in FIG. 2 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 21.

At block 21, generating a first operation parameter according to a data acquisition protocol.

In the embodiment, the data acquisition protocol includes a data format sub protocol, which is used to define the format of the first operation parameter of the industrial device 10, and the industrial device 10 can generate the first operation parameter according to the data format sub protocol.

For example, the data format sub protocol can define the format of the first operation parameter of the industrial device 10 as a specific JavaScript Object Notation (JSON) format. The format is based on the Representational State Transfer (REST) architecture, the REST architecture is compatible with most industrial devices 10, has wide applicability and simple syntax structure, and can be used for efficient data transmission.

The specific JSON format includes three fields: DataType, DataLabel, and DataContent. The content of the field for data type is the type of data, and the format is string, such as File type or String type.

The content of the field for data label is the relevant information of the industrial device 10, and the format is string, for example: MachineStatusData, ProductData, MachineBaseInfo.

In some embodiments, the field for data label can be configured in advance, and different data label fields can be configured and applied for different industrial devices 10.

The content of the field for data content is the detailed data corresponding to the data type field, and the format is string. For example, the field for data content of the machine status information includes data content fields such as Status, EventCode, EventMsg, and EventOutData.

In the embodiment, when the content of the data type field is a file, the content of the data content field is the path address of the file. When the content of the data type field is a string, the content of the data content field is a string representing detailed data.

In the embodiment, the data format sub protocol includes a general data format sub protocol and other data format sub protocols. The general data format sub protocol is used to specify the general data generated by the industrial device 10 and the type of the control instructions output by the server system 11. The general data includes the first operation parameter such as the operating state, real-time data, and production process data of the industrial device 10, and the control instruction includes controlling the operation state of the industrial device 10, such as pausing, shutdown, and issuing alarm of the industrial device 10. For example, the following are the first operation parameter generated by the industrial device 10 according to the general data format sub protocol:

{"DataType": "String", "DataLabel": "MachineStatusData", "DataContent": {"Status": "R", "StatusTime": "2019-10-11 14:28:57.232", "EventCode": "001", "EventMsg": "PCBSNScan", "EventOutData": {"Site1": "XXX000054", "Site2": "XXX000055"}}}

The data indicates that the data type is string, and the data label is machine status information. The data content includes:

The machine state, which has value indicating that the red light (Red, R) of the industrial device 10 is on, and alarm has issued concerning the industrial device 10;

The status time, which has value of 14:28:57.232 on Oct. 11, 2019;

The event code is 001;

The event message which has value equal to the serial number (SN) of the scanned printed circuit board (PCB);

The event details, which has values including position 1 and position 2. The actual value of position 1 is xxx000054 and the actual value of position 2 is xxx000055.

In the embodiment, other data format sub protocols can define other types of first operation parameter of the industrial device 10. It can be understood that the types of other first operation parameters are not defined in the general data format sub protocol, for example, the steel wire of the printer being offline, the frequency of replacement of wiping paper, the solder paste height, the surface area, the amount or volume of paste, and other data detected by the solder paste detector.

For example, when the industrial device 10 is a reflow furnace, other data format sub protocols can define the setting parameters, real-time data, and production process data of the industrial device 10 which are not defined in the general data format sub protocol. The specific format of the setting parameters of the reflow furnace is: DataType is string, DataLabel is SonicReflowSettingData, and DataContent includes the model of the reflow furnace, program name, value of temperature in each temperature zone, value of oxygen concentration, speed of motor set, state of motor, and other data. The specific format of the working real-time parameters of the reflow furnace are: DataType is string, DataLabel is SonicReflowRealData, and DataContent elements of the data include the actual value of the temperature in each temperature zone, the actual value of the oxygen concentration, the actual speed of the motor, the actual state of the motor, the number of printed circuit boards going through the current furnace, the output time, and other data.

It can be understood that the data format sub protocol solves the problems of incomplete data dimensions and lack of a unified standard generated by different industrial devices 10, and improves the data quality.

In the embodiment, complete data includes three fields: data type, data label and data content. After generating a complete data according to the data format sub protocol, the industrial device 10 can write an <FXEOF> statement after the data content field to represent the end of the complete data.

The server system 11 can determine whether the complete data is ended by detecting the <FXEOF> statement, so as to prevent reading errors of the first operation parameter by the server system 11 due to packet sticking or packet loss during network transmission, and improve the data stability of the first operation parameter and the fault tolerance of the data read by the server system 11.

The data protocol defines the type and format of the first operation parameter of the industrial device 10. Different industrial devices 10 can obtain the first operation parameter with different types and the same format according to the data acquisition protocol, which can reduce the complexity of the first operation parameter of different industrial devices 10 and facilitate the efficiency of data processing and analysis by the server system 11. This resolves the problem of data dimensions of the first operation parameter of different industrial device 10 being incomplete where no unified standard is used. The server system 11 does not need to adapt to different industrial devices 10 separately, which effectively reduces the difficulty of the development of the server system 11 and shortens the software development cycle of the server system 11 and the industrial device 10.

At block 22, accessing the server system according to the data acquisition protocol.

In the embodiment, the data acquisition protocol also includes a device access sub protocol, the device access sub protocol includes a module call sub protocol, an instruction transmission sub protocol and a data output sub protocol. The module call sub protocol defines the way in which the industrial device 10 calls up the software development kit (SDK) to transmit the first operation parameter of the industrial device 10.

In one embodiment, the software development kit can include one or more functional programs, and each functional program can correspond to one function. The software development kit may also include interface configuration information for calling up external programs and executing the one or more function programs to realize one or more functions. Any program can be used as a module to be called up according to the interface configuration information.

In one embodiment, the software development kit can create a collection of application software development tools for software packages, software frameworks, hardware platforms, and operating systems provided by third-party developers.

The equipment manufacturer of the industrial device 10 can store the software development kit in the software operation directory of the industrial device 10, so that the industrial device 10 realizes functions in the software development kit through external call up. For example, the industrial device 10 can output the first operation parameter of the industrial device 10 by calling up the software development kit.

In the embodiment, the industrial device 10 can call up the intent (string line, string stationtype, string machineID) function in the software development kit to initialize the parameters of the software development kit. The parameter line is the name of the production line where industrial device 10 is located, the parameter stationtype is the process name, and the parameter machineID is the machine number. For example, the industrial device 10 can use the intent ("PCB", "reflow", "A03") function to initialize the software development kit. The production line of the industrial device 10 is printed circuit board (PCB), the process name is reflow, and the machine number is A03.

The software development kit can provide a configuration interface or a preset JSON format configuration file, and the production engineer can adjust the parameters of the industrial device 10 by configuring the configuration interface or editing the preset configuration file. For example, the production engineer can adjust the machine number, and production line name of the industrial device 10 by configuring the configuration interface or by editing the preset configuration file.

After the industrial device 10 calls up the intent (string line, string stationtype, string machineID) function to initialize the parameters of the software development kit, the industrial device 10 may create a port for communicating with the server system 11. The port can have a preset port number, and different industrial devices 10 can create ports with different port numbers. The server system 11 can distinguish between different industrial devices 10 through the preset port number. Therefore, the industrial device 10 can establish the communication connection of the server system 11 through the device access sub protocol.

In the embodiment, the instruction transmission sub protocol is used to define the way in which the industrial device 10 receives the control instruction output by the server system 11, and the industrial device 10 can make operation on the control instruction according to the instruction transmission sub protocol. The format and type of the control instruction are defined in the general data format sub protocol. For example, when the industrial device 10 receives a control instruction to issue an alarm, the industrial device 10 may issue an alarm.

The data output sub protocol is used to define a method for the industrial device 10 to output the first operation parameter. In the embodiment, the industrial device 10 can call up the UniversalDataCollectionFunc function provided by the software development kit to output the first operation parameter with a specific JSON format.

The device access sub protocol solves the problem of high-level coupling between the industrial device 10 and the server system 11, and improve the working independence and scalability of the industrial device 10 and the server system 11. When the industrial device 10 interacts with the server system 11, the industrial device 10 and the server system 11 are readily identifiable to each other, which effectively reduces the delay of identity confirmation between the industrial device 10 and the server system 11, and improves the efficiency and stability of data transmission.

At block 23, performing data processing on the first operation parameter.

The industrial device 10 can process the data of the first operation parameter to ensure that the format of the first operation parameter is correct, concise, and necessary. The data processing may include data verification, data analysis, and other data processing operations.

The data verification includes: the industrial device 10 determines whether the output data conforms to the specific JSON format defined by the data format sub protocol according to the preset logical expression. If the output data does not conform to the specific JSON format defined by the data format sub protocol, the data verification fails, and the industrial device 10 needs to regenerate the first operation parameter in accordance with the specific JSON format. If the output data conforms to the specific JSON format defined by the data format sub protocol, the data verification is successful.

The data analysis includes: the industrial device 10 reads the data content field according to the data type field and the data label field in the first operation parameter, and extracts the data element in the data content field.

The other data processing operations include: data filtering, identifier binding, and compression and encoding, wherein data filtering refers to selecting data to be transmitted to the server system 11. The identifier binding refers to associating the first operation parameter of the industrial device 10 with the industrial device 10, which is used by server system 11 to confirm the type and model of industrial device 10. The compression refers to the use of a specific algorithm to reduce the size of the first operation parameter to more efficiently transmit data to the server system 11. The encoding refers to the character conversion of the first operation parameter according to specific rules to ensure the confidentiality, anti-interference, and other performance of the first operation parameter.

The industrial device 10 obtains the second operation parameter after processing the data of the first operation parameter. When the server system 11 receives the second operation parameter, it needs to decode, to decompress, and to do other operations.

It can be understood that data processing of the first operation parameter can ensure that the first operation parameter is in the correct format, reduce the data size of the first operation parameter of the industrial device 10, improve the data transmission efficiency, screen out the types of the first operation parameter that need subsequent data processing by the server system 11, and improve the work efficiency of the server system 11.

At block 24, uploading the second operation parameter and receiving the control instruction.

In the embodiment, after the industrial device 10 processes the data of the first operation parameter, the second operation parameters are obtained, and the industrial device 10 can upload the second operation parameters to the server system 11.

The uploading of the second operation parameter may include: encapsulating the second operation parameter according to the specific transmission protocol and uploading them to the server system.

The encapsulation refers to filling the data packet header of the second operation parameter to form a data packet. It can be understood that the data packet can be transmitted to the server system 11 through a specific network transmission protocol.

In some embodiments, the network transmission protocol can be a Message Queuing Telemetry Transport (MQTT) protocol or a Hypertext Transfer Protocol (HTTP).

In some embodiments, the uploading of the second operation parameter may further include: detecting the network environment automatically and caching the second operation parameter in the local SQLite database of the industrial device 10 when the network is unstable. When the network connection is restored, the data is retransmitted. SQLite is an embedded database, which is used to store data and manage its stored data. For example, the industrial device 10 can store the output data in SQLite when the network environment is poor or the network connection is interrupted, take the output data out of SQLite after the network connection is restored, and transmit it to the server system 11.

In the embodiment, the server system 11 can transmit the control instruction to the industrial device 10 according to the second operation parameter of the industrial device 10, to control the state of the industrial device 10. For example, the server system 11 may transmit a control instruction for controlling the industrial device 10 to restart. The industrial device 10 can receive the control instruction from the server system 11 and operate the control instruction according to the instruction transmission sub protocol.

The control instruction can enable the server system 11 to remotely control the industrial device 10 according to the second operation parameter of the industrial device 10, without additional operation of the industrial device 10 by the production line engineer, reducing the engineer's workload.

At block 25, monitoring the operating environment.

In the embodiment, the industrial device 10 can detect its own operation state during its operation.

When the operation state of the industrial device 10 is abnormal, the industrial device 10 can be restarted to return to the normal operation state.

The work capacity of the industrial device 10 is improved, and the work efficiency of the industrial device 10 is enhanced.

Figure 3:
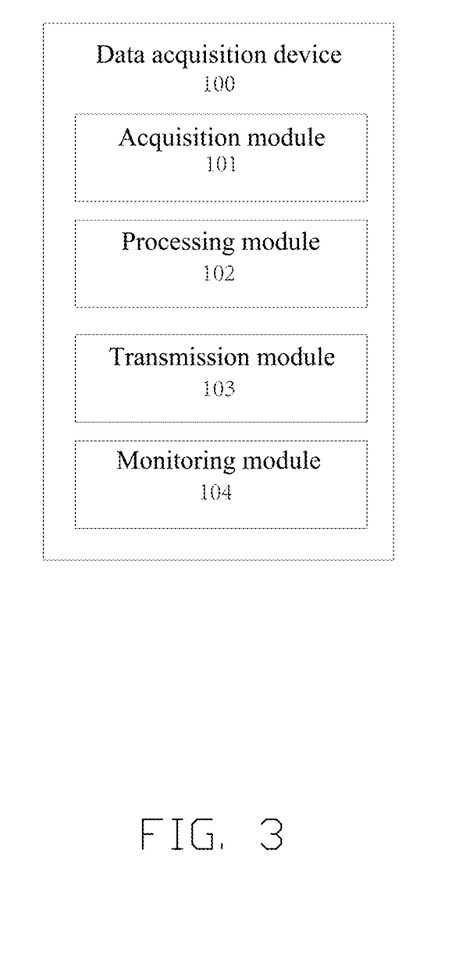
FIG. 3 is a block diagram of an embodiment of a data acquisition device according to the present disclosure.

FIG. 3 illustrates a data acquisition device 100 in accordance with an embodiment of the present disclosure.

As shown in FIG. 3, the data acquisition device 100 may include a plurality of functional modules composed of program code segments. The program code of each program segment in the data acquisition device 100 can be stored in the storage device of the industrial device 10 and executed by the processor of the industrial device 10 to perform the data acquisition function. The data acquisition device 100 may also include interface configuration information for calling up an external program and executing the one or more function programs to realize one or more functions. For any function program, it can be used as a module for external programs to call up according to the interface configuration information.

In the embodiment, the data acquisition device 100 can be divided into a plurality of functional modules according to the functions performed. The functional modules include an acquisition module 101, a processing module 102, and a transmission module 103.

The acquisition module 101 is used to obtain the first operation parameter of the industrial device 10 according to the data acquisition protocol.

The data acquisition protocol includes a data format sub protocol, which is used to define the format of the first operation parameter of the industrial device 10. The acquisition module 101 can generate the first operation parameter of the industrial device 10 according to the data format sub protocol.

The acquisition module 101 is also used to access the server system according to the data acquisition protocol.

The data acquisition protocol also includes a device access sub protocol, and the data acquisition protocol includes a module callup sub protocol, an instruction transmission sub protocol, and a data output sub protocol. The acquisition module 101 can generate a specific port number according to the device access sub protocol to establish network communication with the server system 11.

In the embodiment, after establishing the network communication with the server system 11, the acquisition module 101 can export the first operation parameter according to the data output sub protocol.

The processing module 102 is used for data processing of the first operation parameter.

The processing module 102 can process the data of the first operation parameter to ensure that the format of the first operation parameter is correct, concise, and necessary. The data processing may include data verification, data analysis, and other data processing operations.

The data verification includes: the processing module 102 determines whether the output data conforms to the specific JSON format defined by the data format sub protocol according to the preset logical expression. If the output data does not conform to the specific JSON format defined by the data format sub protocol, the data verification fails, and the acquisition module 101 needs to regenerate the first operation parameter in accordance with the specific JSON format. If the output data conforms to the specific JSON format defined by the data format sub protocol, the data verification is successful.

The data analysis includes: the processing module 102 reads the data content field according to the data type field and the data label field in the first operation parameter, and extracts the data element in the data content field.

The other data processing operations may include: data filtering, identifier binding, and compression and encoding, wherein data filtering refers to selecting the data to be transmitted to the server system 11. The identifier binding refers to associating the first operation parameter of the industrial device 10 with the industrial device 10, which is used by server system 11 to confirm the type and model of industrial device 10. The compression refers to the use of a specific algorithm to reduce the size of the first operation parameter to more efficiently transmit data to the server system 11. The encoding refers to the character conversion of the first operation parameter according to specific rules to ensure the confidentiality, anti-interference, and other performance of the first operation parameter.

The processing module 102 obtains the second operation parameter after processing the data of first operation parameter. When the server system 11 receives the second operation parameter, it needs to decode, decompress, and do other operations.

The transmission module 103 is used to upload the second operation parameter and receive the control instruction.

In the embodiment, after the processing module 102 processes the data of the first operation parameter, the second operation parameter is obtained, and the transmission module 103 can upload the second operation parameter to the server system 11.

The uploading of the second operation parameter may include: the transmission module 103 encapsulates the second operation parameter according to the specific transmission protocol and uploads it to the server system.

The encapsulation refers to infilling the data packet header of the second operation parameter to form a data packet. It can be understood that the data packet can be transmitted to the server system 11 through a specific network transmission protocol.

In some embodiments, the network transmission protocol can be MQTT protocol or HTTP.

In some embodiments, the uploading of the second operation parameter may further include: the transmission module 103 detecting the network environment automatically and caching the second operation parameter in the local SQLite database of the industrial device 10 when the network is unstable. When the network connection is restored, the data is retransmitted. SQLite is an embedded database, which is used to store data and manage its stored data. For example, the transmission module 103 can store the output data in SQLite when the network environment is poor or the network connection is interrupted, and take the output data out of SQLite after the network connection is restored and transmit it to the server system 11.

In the embodiment, the server system 11 can transmit the control instruction to the transmission module 103 according to the second operation parameter. The transmission module 103 may transmit the control instruction to the processing module 102, and the processing module 102 may control the state of the industrial device 10 accordingly. For example, the server system 11 may transmit a control instruction for issuing an alarm of the industrial device 10 to the transmission module 103. The transmission module 103 can receive the control instruction from the server system 11, transmit the control instruction to the processing module 102, and the processing module 102 can operate the control instruction according to the instruction transmission sub protocol. For example, the server system 11 can transmit a control instruction for issuing the alarm of the industrial device 10 to the transmission module 103, and the processing module 102 can cause the industrial device 10 to issue an alarm accordingly.

The data acquisition device 100 may also include a monitoring module 104, the monitoring module 104 is used to monitor the operating environment of the data acquisition device 100.

In the embodiment, the monitoring module 104 can detect the operation state of the data acquisition device 100 during the operation of the data acquisition device 100. When the operation state is abnormal, the monitoring module 104 can control the data acquisition device 100 to restart, to return to the normal operation state.

Figure 4:
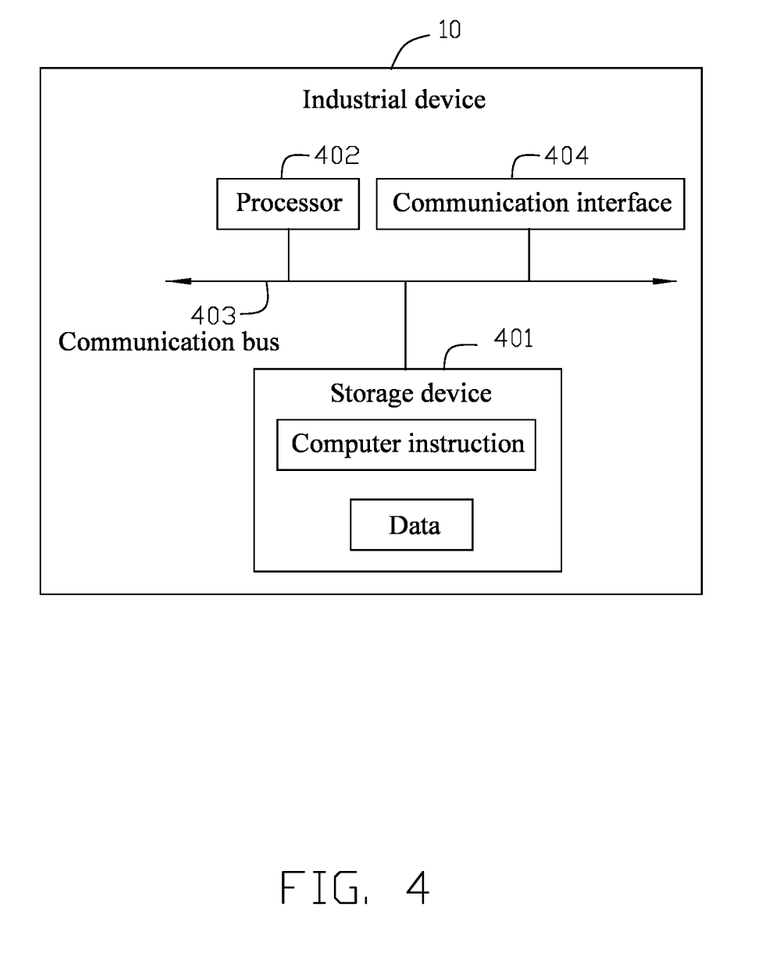
FIG. 4 is schematic diagram of an embodiment of the industrial device according to the present disclosure.

FIG. 4 illustrates an industrial device 10 in accordance with an embodiment of the present disclosure.

The industrial device 10 can further include, but is not limited to, a storage device 401, at least one processor 402, and at least one communication bus 403 and a communication interface 404. Those skilled in the art should understand that the structure of the industrial device 10 shown in FIG. 4 does not constitute a limitation of the embodiment of the application. It can be either a bus structure or a star structure. The industrial device 10 can also include more or less other hardware or software than shown in the figure, or have different component arrangements. The processor 402, the storage device 401, and the communication interface 404 can be connected and communicate with each other through the communication bus 403. The processor 402 may execute the program code of program segment stored in the storage device 401 to implement blocks 21-25 in the method shown in FIG. 2. The processor 402 may execute the program code of a program segment to implement the functions of the data acquisition device 100 shown in FIG. 3.

The modules 101-104 include computer instructions or codes in form of one or more programs that may be stored in the storage device 401, and which are executed by the at least one processor 402. In other embodiment, the modules 101-104 may also be a program instruction or firmware that is embedded in the processor 402.

The industrial device 10 is an electronic device which works according to preset or stored instructions. The hardware of the industrial device 10 includes but is not limited to microprocessor, special integrated circuit, programmable gate array, digital processor, and embedded equipment. The industrial device 10 may also include customer equipment, which includes but is not limited to, any electronic product that can interact with the customer through keyboard, mouse, remote control, touch pad, or voice control equipment, such as personal computer, tablet computer, smart phone, digital camera. It should be noted that the industrial device 10 is only an example, and other existing or possible devices 10 in the future, if applicable to the present disclosure, should also be included in the scope of protection of the present disclosure and included here by reference.

The storage device 401 can be used to store the program segment. The processor 402 operates or executes the program segment stored in the storage device 401 and calls up or recalls data stored in the storage device 401, and implements various functions of the industrial device 10. The storage device 401 may include a storage program area and a storage data area, the storage program area may store an operating system, an application (such as sound playback and image playback) required for at least one function. The storage data area may store data created.

The storage device 401 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The processor 402 may be a central processing unit (CPU), or may be other general purpose processor, a digital signal processor (DSP), an application specific integrated circuit (ASIC), a Field-Programmable gate array (FPGA) or other programmable logic device, a transistor logic device, or a discrete hardware component. The general purpose processor may be a microprocessor. The processor 402 may also be any conventional processor. The processor 402 is a control center of the industrial device 10. The processor 402 connects the parts of the industrial device 10 by using various interfaces and lines.

In some embodiments, the communication interface 404 uses devices such as a transceiver to communicate with other devices or communication networks, such as Ethernet, wireless access network (RAN), wireless local area networks (WLAN).

The block diagram merely shows an example of the industrial device 10 and does not constitute a limitation to the industrial device 10. In other examples, more or less components than those illustrated may be included, or some components may be combined, or different components used. For example, the industrial device 10 may also include input and output devices, a network access devices, a bus, and the like. The industrial device 10 may also include a power supply (such as a battery) for supplying power to each component. Alternatively, the power supply may be logically connected with the at least one processor 402 through the power management device, so as to realize the functions of managing battery charging, discharging, power consumption management, and the like through the power management device. The power supply can also include one or more DC or AC power supplies, recharging devices, power failure detection circuits, power converters or inverters, power status indicators, and other components. The industrial device 10 may also include a variety of sensors, and BLUETOOTH units, etc., which will not be repeated here.

The modules and units integrated by the industrial device 10, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media.

Further, the computer readable storage medium may be nonvolatile or volatile. The computer readable storage medium mainly includes a storage program area and a storage data area, the storage program area can store an operating system, and an application program required for at least one function.

In a further embodiment, based on FIG. 3, the at least one processor 402 can execute the operating device of the industrial device 10, and various installed applications (such as the data acquisition device 100), program codes, for example, the above units.

Based on the same concept, the embodiments of the present disclosure also provide a non-transitory storage medium. The computer instruction is stored in the non-transitory storage medium. When the instructions are run on the industrial device 10, the industrial device 10 can execute the data acquisition method provided by the above embodiment.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data acquisition method applied to an industrial device and comprising:
generating a first operation parameter according to a data acquisition protocol, wherein the data acquisition protocol comprises a device access sub protocol and a data format sub protocol;
performing data processing on the first operation parameter to obtain a second operation parameter;
uploading the second operation parameter to a server system; and
receiving a control instruction from the server system;
wherein the control instruction is generated by the server system according to the second operation parameter, the control instruction is configured to control operation state of the industrial device;
encapsulating compressed or encoded data element to obtain an encapsulated data element according to a network protocol, detecting communication state between the industrial device and the server system, caching the encapsulated data element in a local database of the industrial device if the communication state is unstable, and uploading the encapsulated data element to the server system if the communication state is stable;
establishing communication with the server system, wherein the data format sub protocol is configured to indicate format of the first operation parameter;
verifying the first operation parameter according to the data format sub protocol;
determining whether the format of the first operation parameter is consistent with the format indicated by the data format sub protocol; and
analyzing the first operation parameter according to the data format sub protocol, and extracting data element in the first operation parameter.

2. An industrial device, comprising:
a storage device; and at least one processor, wherein the storage device stores one or more programs, when executed by the at least one processor, the one or more programs cause the at least one processor to:
generate a first operation parameter according to a data acquisition protocol, wherein the data acquisition protocol comprises a device access sub protocol and a data format sub protocol;
perform data processing on the first operation parameter to obtain a second operation parameter;
upload the second operation parameter to a server system; and
receive a control instruction from the server system;
wherein the control instruction is generated by the server system according to the second operation parameter, the control instruction is configured to control operation state of the industrial device;
encapsulate compressed or encoded data element to obtain an encapsulated data element according to a network protocol, detect communication state between the industrial device and the server system, cache the encapsulated data element in a local database of the industrial device if the communication state is unstable, and upload the encapsulated data element to the server system if the communication state is stable;
establish communication with the server system, wherein the data format sub protocol is configured to indicate format of the first operation parameter;
verify the first operation parameter according to the data format sub protocol;
determine whether the format of the first operation parameter is consistent with the format indicated by the data format sub protocol; and
analyze the first operation parameter according to the data format sub protocol, and extract data element in the first operation parameter.

3. A non-transitory storage medium having stored thereon instructions that, when executed by a processor of a computer device installed in an industrial device, causes the processor to perform a data acquisition method, wherein the method comprises:
generating a first operation parameter according to a data acquisition protocol, wherein the data acquisition protocol comprises a device access sub protocol and a data format sub protocol;
performing data processing on the first operation parameter to obtain a second operation parameter;
uploading the second operation parameter to a server system; and
receiving a control instruction from the server system;
wherein the control instruction is generated by the server system according to the second operation parameter, the control instruction is configured to control operation state of the industrial device;
encapsulating compressed or encoded data element to obtain an encapsulated data element according to a network protocol, detecting communication state between the industrial device and the server system, caching the encapsulated data element in a local database of the industrial device if the communication state is unstable, and uploading the encapsulated data element to the server system if the communication state is stable;
establishing communication with the server system, wherein the data format sub protocol is configured to indicate format of the first operation parameter;
verifying the first operation parameter according to the data format sub protocol;
determining whether the format of the first operation parameter is consistent with the format indicated by the data format sub protocol; and
analyzing the first operation parameter according to the data format sub protocol, and extracting data element in the first operation parameter.

* * * * *